May 19, 1964   W. SIPOS   3,133,470
MACHINE TOOL POSITIONING APPARATUS
Filed March 27, 1962   3 Sheets-Sheet 1

Walter Sipos
INVENTOR.

BY *Clarence A. O'Brien*
*and Harvey B. Jacobson*
Attorneys

May 19, 1964  W. SIPOS  3,133,470
MACHINE TOOL POSITIONING APPARATUS
Filed March 27, 1962  3 Sheets-Sheet 2
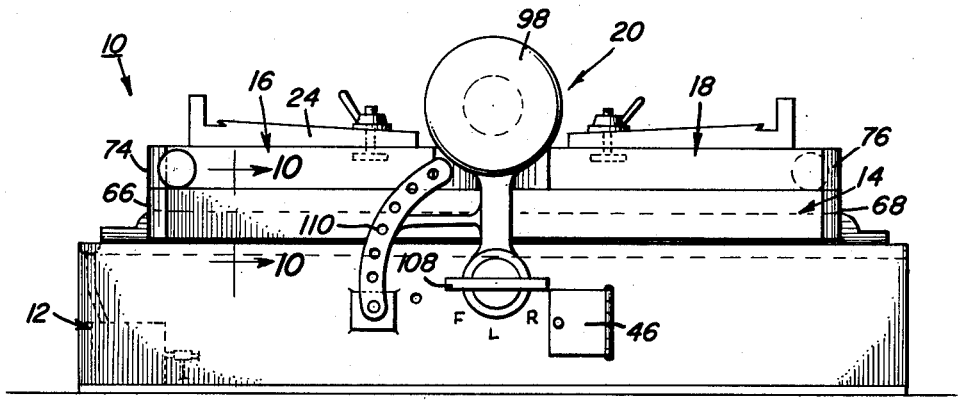
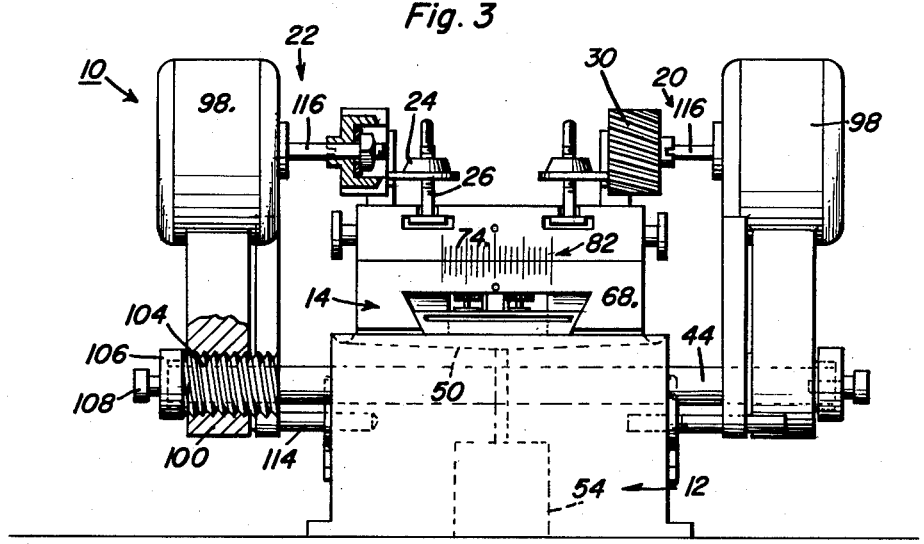
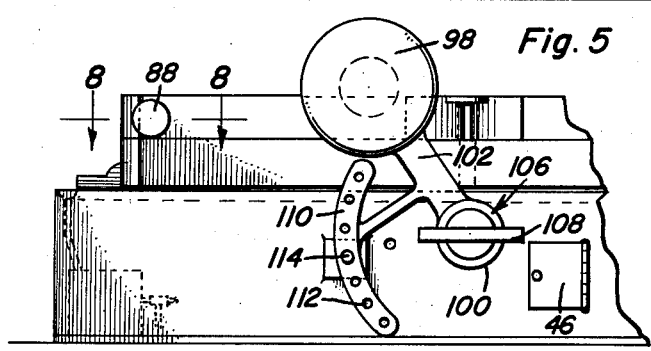
Walter Sipos
INVENTOR.

May 19, 1964   W. SIPOS   3,133,470
MACHINE TOOL POSITIONING APPARATUS
Filed March 27, 1962   3 Sheets-Sheet 3
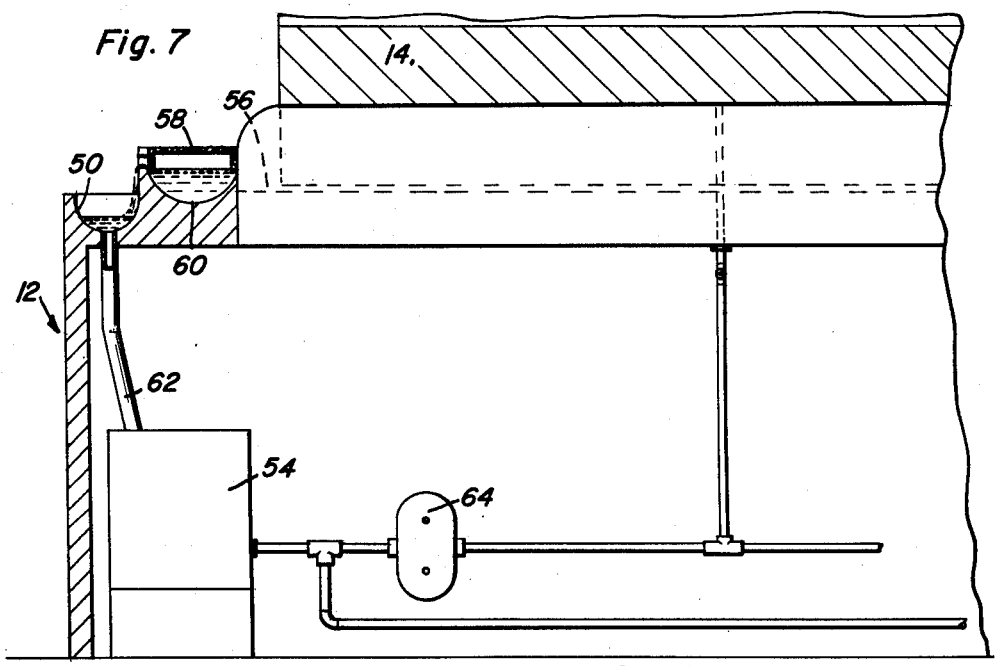
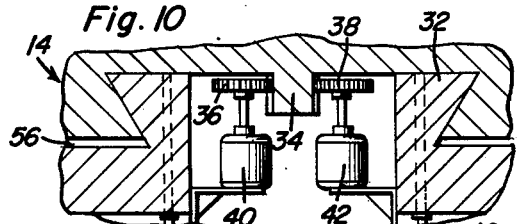
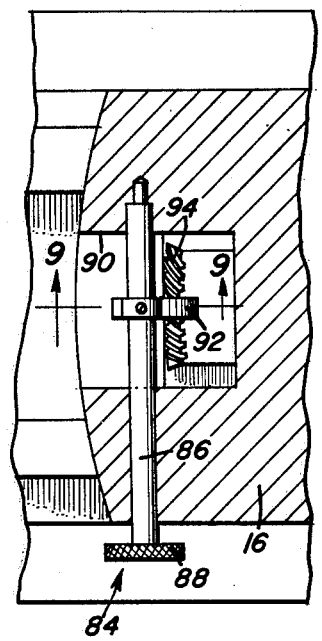
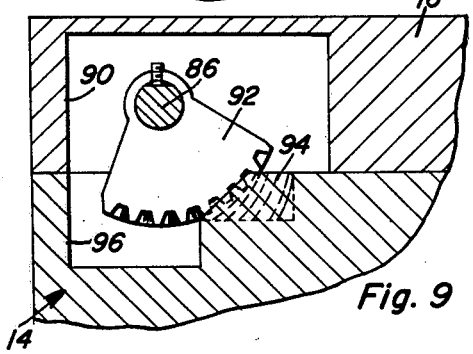
Walter Sipos
INVENTOR.
BY
Attorneys

3,133,470
MACHINE TOOL POSITIONING APPARATUS
Walter Sipos, 108 Chestnut St., Albany, N.Y.
Filed Mar. 27, 1962, Ser. No. 182,736
13 Claims. (Cl. 90—11)

This invention relates generally to machine tools and more particularly to a planer type of end milling machine.

The machine tool of the present invention involves a novel work positioning and cutting arrangement particularly useful for production work such as the cutting of tapers on gibs at different taper angles. It will be appreciated of course, that other machine tool operations may be performed pursuant to the principles of the present invention employing various types of rotary tools with respect to which adjustably mounted workpieces are reciprocated or held stationary.

Thus, an important object of the present invention is to provide a work positioning arrangement in connection with the aforementioned type of machine tool which eliminates the necessity of adjustable precision mounting of workpieces on the work supporting platen of the machine table and further enables the simultaneous cutting of workpieces at different cutting angles, or for drilling, tapping and grinding operations.

Another object of the present invention is to provide a machine tool of the planer type but less massive in contrast to comparable types of machines heretofore utilized because of a direct drive arrangement for the end milling cutters associated with the machine. The machine tool of the present invention therefore includes a table disposed at a fixed height above the floor which is reciprocated back and forth under cutters as in a planer but with a relatively slow feed movement, the speed function being provided by the rapidly revolving milling cutters directly driven by separate motors adjustably mounted on opposite lateral sides of the machine tool bed. The cutter driving motors are therefore adjustably mounted toward and away from the reciprocated table and also angularly adjusted with respect thereto for accommodating different work cutting heights.

An additional object of the present invention is to provide a novel work supporting and positioning table structure for machine tools wherein a pair of work supporting platens are adjustably mounted on a slide member with respect to a central adjusting axis. Each of the work supporting platens is provided with fixed parallel T-slots within which work may be clamped in a conventional manner without any special adjustable work supporting fixtures. Adjustable positioning of the work on the table is instead accomplished by accurate pivotal displacement of the work supporting platens independently of each other to adjusted positions. Accordingly, a plurality of workpieces mounted on each of the separate platens may be simultaneously accurately positioned with respect to the slide.

An additional object of the present invention is to provide a machine tool construction of the planer type featuring a novel lubricant re-circulation system which reduces maintenance and loss of lubricant.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the machine tool illustrated in FIGURE 1.

FIGURE 3 is an end view of the machine with parts broken away and shown in section.

FIGURE 5 is a partial side elevational view of the machine similar to that of FIGURE 2 but illustrating one of the cutter motors in a height adjusted position.

FIGURE 7 is a partial sectional view taken substantially through a plane indicated by section line 7—7 in FIGURE 1.

FIGURE 8 is a partial sectional view taken substantially through a plane indicated by section line 8—8 in FIGURE 5.

FIGURE 9 is a partial sectional view taken substantially through a plane indicated by section line 9—9 in FIGURE 8.

FIGURE 10 is a partial sectional view taken substantially through a plane indicated by section line 10—10 in FIGURE 2.

Figure 1:
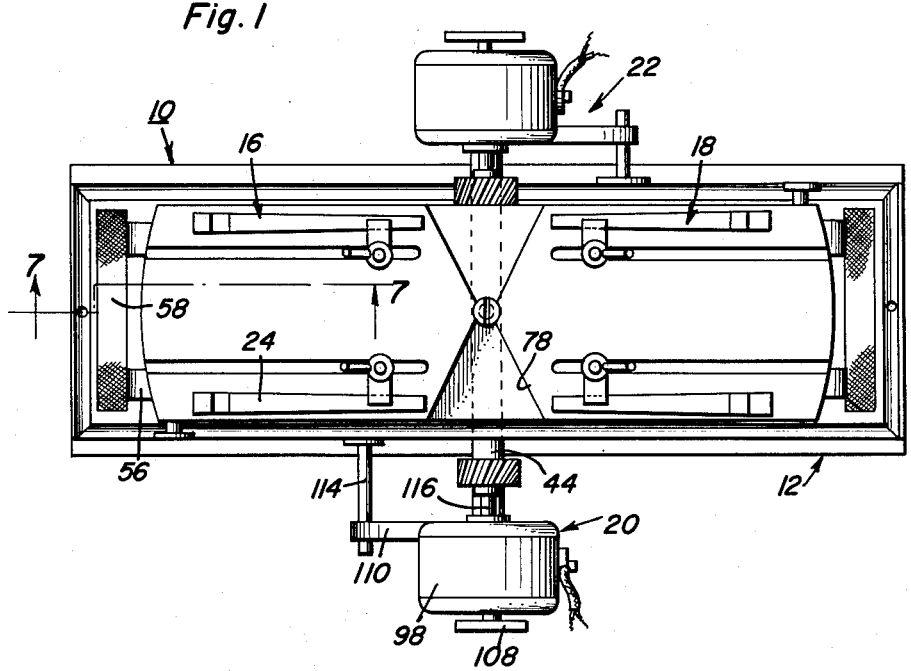
FIGURE 1 is a top plan view of the machine tool of the present invention in a neutral or aligned position.
Figure 4:
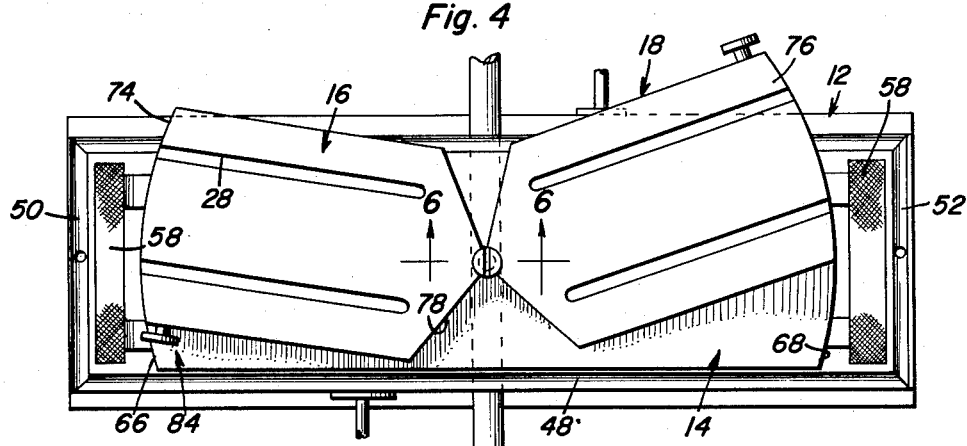
FIGURE 4 is a partial top plan view of the machine tool similar to that of FIGURE 1 but illustrating the machine in an adjusted position.

Referring now to the drawings in detail, it will be observed from FIGURES 1, 2 and 3, that the machine tool generally referred to by reference numeral 10 consists of a machine bed or base 12 generally similar to small types of planer beds and which contain storage space, controls and drive mechanism for reciprocating a table slide carriage assembly generally referred to by reference numeral 14. Adjustably mounted on the table slide assembly 14, are a pair of work supporting platens 16 and 18. Adjustably mounted in laterally fixed relation to the bed 12 on opposite longitudinal sides thereof, are a pair of direct driven tool assemblies generally referred to by reference numerals 20 and 22. A plurality of workpieces 24 clamped to the work supporting platens 16 and 18 by suitable work engaging devices 26 received within the work clamping T-slots 28 that are fixedly formed within the work supporting platens, are thereby reciprocated with the slide assembly 14 past the stationary cutter assemblies 20 and 22 each of which includes a rotating end mill cutter 30. It will therefore become apparent, that each of the end milling cutters 30 when positioned up against the workpieces 24 after the work supporting platens 16 and 18 have been adjusted to a predetermined angular position such as shown in FIGURE 4, tapers may be cut on the workpieces at different angles determined by the position of the work supporting platens with which the workpieces are associated. Other tools may replace the cutters 30.

The machine tool bed 12 may be made of any suitable dimensions in accordance with the size of the workpieces to be machined and the loads to be sustained. Further, the bed 12 is generally similar to a planer bed and includes on the top surface thereof, a guideway 32 as more clearly seen in FIGURE 10 for slidably mounting the slide assembly 14 along a fixed longitudinal axis. Accordingly, located within the bed 12 are suitable driving mechanisms for effecting reciprocation of the slide assembly 14. For example, a double sided rack 34 may project downwardly from the slide assembly 14 for meshing engagement with drive gears 36 and 38 directly driven by motors 40 and 42 mounted adjacent opposite ends of the bed 12 and suitably wired in a control system for rotation or position locking. The bed 12 also supports centrally thereof a motor mounting shaft 44 that extends transversely therethrough and projects from opposite longitudinal sides for supporting the cutter assemblies 20 and 22 in laterally spaced relation to the bed. Each longitudinal side of the bed may also have a hingedly mounted door 46 providing access to storage space within the bed.

Peripherally mounted on the top surface of the bed are lubricant receiving grooves including parallel longitudinal grooves 48 arranged to receive oil and conduit flow thereof toward grooves 50 and 52 disposed at opposite longitudinal ends of the bed. The end grooves 50 and 52 also taper downwardly toward a central portion as shown by dotted line in FIGURE 3 for return of oil to the reservoir 54. The oil received within the end grooves 50 and 52 is also derived from the lubricating fluid displaced by reciprocation of the slide within the guideways 56 and the top surface of the bed 12. Thus, an oil filtering element 58 is disposed at each end of the bed 12 at the ends of the guideways 56 through which oil may be filtered of the dirt and metal filings before collection within the oil collecting trough 60 at each end of the bed as more clearly seen in FIGURE 7. When a predetermined amount of oil within the trough 60 is accumulated, it will overflow into the end grooves 50 leaving any additional sedimentary impurities that may have passed through the filtering element 58, at the bottom of the trough 60. The lubricant may then return by the conduit 62 from the end collecting grooves 50 to the reservoir 54 from which it may be drawn by the pump 64 for supply to various lubricating points of the machine.

Figure 6:
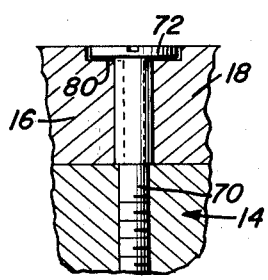
FIGURE 6 is a partial sectional view taken through a plane indicated by section line 6—6 in FIGURE 4.

The slide assembly 14 as hereinbefore indicated, will be reciprocated with respect to the table and thereby reciprocate the workpieces 24 mounted thereon relative to the cutter assemblies 20 and 22. Inasmuch as the slide assembly 14 adjustably mounts the work supporting platens 16 and 18, the end faces 66 and 68 of the slide assembly may be made arcuate in shape with the center of curvature being the vertical axis that extends upwardly in perpendicular intersecting relation to the cutter feeding axis which extends through the motor mounting shaft 44. The vertical axis therefore constitutes the pivotal adjustment axis about which the platens are adjusted. Accordingly, the slide assembly 14 has secured thereto a pivot member 70 through which the vertical adjustment axis extends, said pivot member projecting above the slide assembly 14 and having connected to the upper end thereof, an enlarged flat head portion 72 as more clearly seen in FIGURE 6.

The platen members 16 and 18 are provided with arcuate end surfaces 74 and 76 having curvatures the center of which is also located at the vertical adjusting axis which extends through the pivot member 70. Each platen member also includes tapered end portions 78 opposite the arcuate end portions terminating in an apex portion which pivotally bears against the pivot member 70 and which also includes an arcuate recess 80 for receiving therewithin a portion of the head 72 on the pivot member 70. Thus, the pivot member head 72 is disposed flush with the horizontal plane common to the top surfaces of both platens 16 and 18. It will therefore be necessary to merely clamp the workpieces 24 to the platens by means of the T-slots 28 and thereafter angularly adjust each of the platens independently of each other with respect to the center pivot member 70. Accurate measured displacement of the platen members may therefore be accomplished through use of a positioning mechanism associated with each of the platens in association with scale indicia 82 mounted on the end surfaces of the platen members and slide assembly as more clearly seen in FIGURE 3.

The platen positioning devices generally referred to by reference numeral 84 include a control shaft member 86 rotatably mounted within each of the platens 16 and 18 and projecting therefrom on opposite longitudinal sides of the machine bed 12 adjacent to the arcuate end portions 74 and 76. A knurled knob 88 may therefore be connected to the projecting end of the control shaft. The control shaft 86 extends through a cavity 90 within the platen members for accommodating limited angular movement of a helical sector gear 92 that is fixed to the control shaft 86. The helical sector gear 92 meshes with a beveled helical gear formation 94 that is formed within a cavity portion 96 adjacent the opposite ends of the slide assembly 14 in alignment with the cavity portions 90 in the platen members whereby the limited angular movement of the sector gear 92 is accommodated. It will therefore be apparent, that upon rotation of the control shaft 86, the shaft 86 and the platen member with which it is associated, will be displaced relative to the slide assembly 14 in view of the meshing engagement between the sector gear 92 and the gear formation 94 formed on an arc having its center at the vertical adjustment axis through the pivot member 70. The pitch of the meshing gear teeth of the gear formations 92 and 94 may therefore be selected so as to be self-locking in order to fixedly maintain the platen members in their angularly adjusted position. It will be appreciated of course, that other suitable platen positioning devices may be utilized for angularly displacing the platen member with respect to its mounting slide assembly and holding it in its angularly adjusted position.

Each of the cutter assemblies 20 and 22 is similar in construction and arrangement except that they are angularly adjusted in opposite directions so that the cutter assembly 20 may accommodate any height of workpiece mounted on the platen 16 while adjustment may be made with respect to the platen 18 on the cutter assembly 22. Each cutter assembly therefore includes an electric motor mounted within a motor casing portion 98 which is connected to an adjustable sleeve portion 100 by a connecting portion 102. The sleeve portion 100 is therefore threadedly engaged with a threaded sleeve 104 as more clearly seen in FIGURE 3, the threaded sleeve 104 being rotatably mounted on the motor mounting shaft 44. The axially outer ends of the fixed motor mounting shaft 44 and the rotatable externally threaded sleeve 104 are received within a drive release type brake device 106 well known to those skilled in the art by means of which the motor mounting sleeve portion 100 will be held in axially fixed position and which may be axially displaced to a new adjusted position when the handle element 108 of the drive release brake device 106 is rotated causing rotation of the sleeve 104 threadedly engaged with the sleeve portion 100 for axial displacement thereof. It will be essential of course, that the sleeve portion 100 and the motor casing 98 connected thereto, be prevented from being angularly displaced but not axially displaced in order to effect the aforementioned adjustment. Accordingly, the motor casing 98 may be held against angular displacement in any adjusted angular position by any suitable arrangement as for example by an arcuate member 110 fixed to the motor casing connecting portion 102 and having a plurality of apertures 112 therein for receiving a projecting locking pin 114 that extends laterally from the machine bed. Thus, each of the motor casings 98 may be angularly adjusted along arcs disposed on opposite sides of the vertical central axis in order to adjust the height of the motor shaft 116 with respect to workpieces on an associated platen member. Connected to the ends of the motor shaft 116, for direct drive thereof, are the end mill cutter elements 30 or other rotary tools if desired.

From the foregoing description, the operation and utility of the machine tool will be apparent. It will therefore be appreciated, that the machine of the present invention is well balanced for vibration free operation because of the separate direct drive of the cutters or grinders which cooperate with separately adjustable work supporting platen members on the slide assembly to simultaneously machine reciprocated work at different angles depending upon the respective position of the platen members. Furthermore, a plurality of workpieces may also be held fixed at the different cutting angles associated with the platen members for direct drive drilling or tapping operations.

The foregoing is considered as illustrative only of the principles of the invention. Further, since numerous modifications and changes will readily occur to those skilled in the art, it is not desired to limit the invention

What is claimed as new is as follows:

1. A machine tool combination comprising, an elongated bed through which a longitudinal axis extends, slide means mounted on said bed having a central aperture through which an adjustment axis extends intersecting said longitudinal axis, a pair of platens carried by said slide means and angularly positioned about said adjustment axis relative to each other and the slide means to provide a pair of work supporting surface in one horizontal plane disposed at adjustable angles to each other and the longitudinal axis of the bed, each of said platens having fixed work clamping means, motor mounting means laterally projecting from opposite sides of said bed and intersecting said adjustment axis to define a cutter feeding axis and cutting height adjustment means projecting laterally from the bed in longitudinally spaced relation to the motor mounting means on opposite sides of the cutter feeding axis.

2. The combination of claim 1, including filtering collecting means mounted on at least one end of said bed for receiving lubricating fluid and overflow return means operatively mounted adjacent the filtering collecting means for re-circulating said lubricating fluid.

3. The combination of claim 2, including central pivot means secured to said slide means and projecting upwardly therefrom through said central aperture and an enlarged flat head connected to an upper end of said pivot means for engaging said pair of platens to retain adjacent portions thereof in said horizontal plane in pivotal bearing relation to said pivot means.

4. The combination of claim 3, wherein each of said platens includes a scale end surface containing indicia means for measured displacement thereof with respect to the slide means and a tapered end surface opposite said scale end surface forming an apex portion recessed below said horizontal plane for receiving said enlarged flat head on the pivot means flush with the horizontal plane, said work clamping means comprising parallel T-slots formed respectively in each of said platens extending from said scale end surface and terminating closely spaced from the tapered end surface.

5. The combination of claim 4, including position adjusting means operatively connected to the platens and slide means for independently displacing each of the platens on the slide means to an adjusted angular position.

6. The combination of claim 1, including central pivot means secured to said slide means and projecting upwardly therefrom through said central aperture and an enlarged flat head connected to an upper end of said pivot means for engaging said pair of platens to retain adjacent portions thereof in said horizontal plane in pivotal bearing relation to said pivot means.

7. The combination of claim 6, wherein each of said platens includes a scale end surface containing indicia means for measured displacement thereof with respect to the slide means and a tapered end surface opposite said scale end surface forming an apex portion recessed below said horizontal plane for receiving said enlarged flat head on the pivot means flush with the horizontal plane.

8. The combination of claim 1, including position adjusting means operatively connected to the platens and slide means for independently displacing each of the platens on the slide means to an adjusted angular position.

9. In a machine tool for performing operations on a plurality of workpieces at different angles, comprising, slide means mounted for reciprocatory movement parallel to a fixed horizontal plane through which a longitudinal axis extends, a plurality of work supporting means adjustably mounted on said slide means for reciprocation parallel to said longitudinal axis, clamping means fixedly mounted on each work supporting means, means for positioning each work supporting means at an adjustable angle to the longitudinal axis, separate motor means adjustably mounted along a fixed feeding axis perpendicular to said longitudinal axis and a plurality of end tool means each directly driven respectively by one of said motor means for simultaneously operating on said plurality of workpieces mounted on said work supporting means by the work clamping means.

10. In a planer type of end milling machine for cutting tapers on a plurality of workpieces at different angles, comprising, slide means mounted for reciprocatory movement parallel to a fixed horizontal plane through which a longitudinal axis extends, a plurality of work supporting means adjustably mounted on said slide means for reciprocation parallel to said longitudinal axis, work clamping means fixedly mounted on each work supporting means, means for positioning each work supporting means at an adjustable angle to the longitudinal axis, separate motor means adjustably mounted along a cutter feeding axis perpendicular to said longitudinal axis, and a plurality of end cutters directly driven respectively by one of said motor means for cutting said plurality of workpieces mounted on said work supporting means by the work clamping means, and height adjustment means operatively connected to each of said motor means for angular positioning thereof about said cutter feeding axis to accommodate the cutting of workpieces on an associated work supporting means.

11. The combination of claim 10 wherein each of said work supporting means includes a platen having a scale end surface containing indicia means for measured displacement thereof with respect to the slide means and a tapered end surface opposite said scale end surface forming an apex portion recessed below said horizontal plane for receiving an enlarged flat head of a pivot means secured to the slide means.

12. The combination of claim 11, including position adjusting means operatively connected to the platens and slide means for independently displacing each of the platens on the slide means to an adjusted angular position.

13. In a machine tool combination having a base, a longitudinally reciprocable carriage, a swivel platen supported thereon, a second swivel platen mounted on said carriage, said platens having adjacent tapered end portions, separate work clamping devices supported on the respective platens, a pivot member fixed to said carriage which serves a common pivot axis for said adjacent end portions of the platens, an independent adjusting mechanism adjacent outer end portions of said platens opposite the adjacent end portions for independent swivel adjustment of each platen about said common pivot axis, a tool feeding shaft fixedly mounted by said base in perpendicular relation to said common pivot axis, and separate tool assemblies mounted on said tool feeding shaft for engagement with workpieces fixedly clamped to the platens by the clamping devices.

References Cited in the file of this patent
UNITED STATES PATENTS

| | | |
|---|---|---|
| 1,096,588 | Baker et al. | May 12, 1914 |
| 1,143,585 | Johnson | June 15, 1915 |
| 1,903,865 | Johnson | Apr. 18, 1933 |
| 2,132,924 | Belden | Oct. 11, 1938 |

FOREIGN PATENTS

| | | |
|---|---|---|
| 8,070 | Great Britain | 1839 |